UNITED STATES PATENT OFFICE.

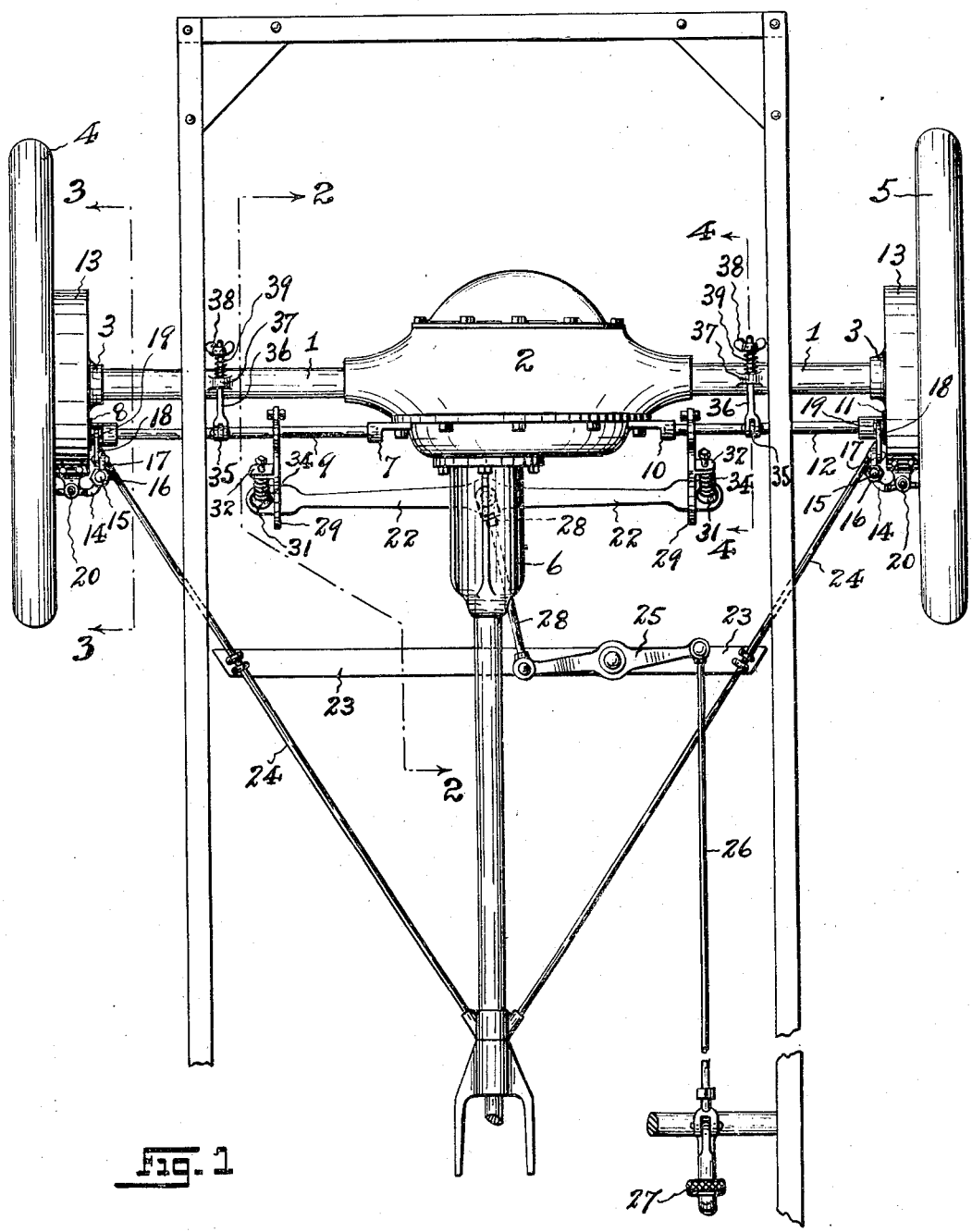

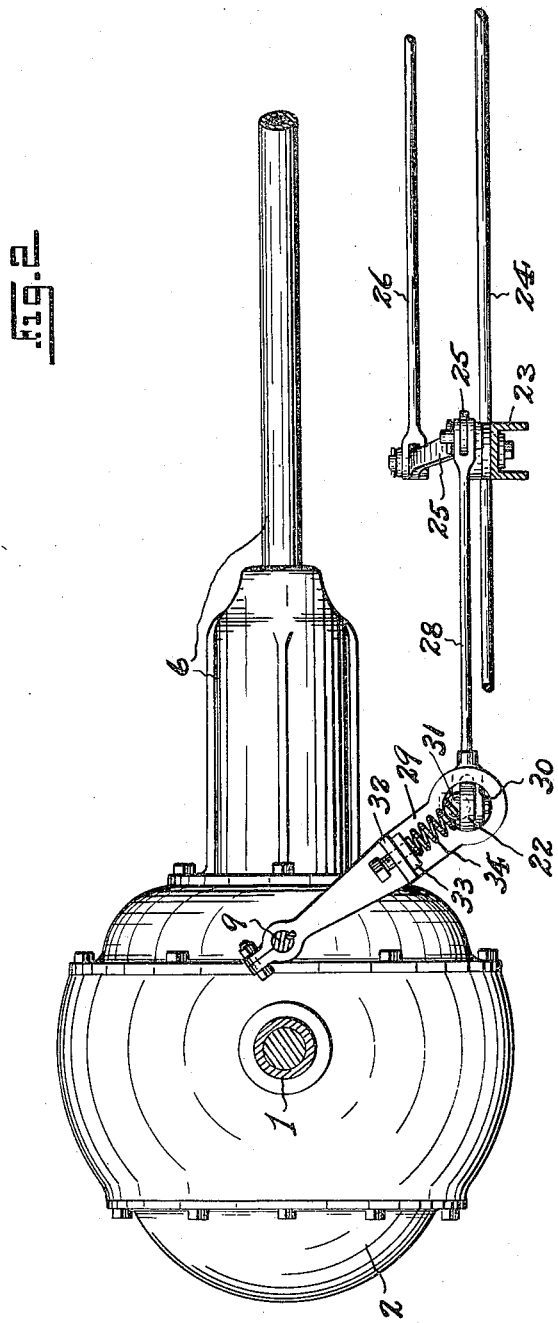

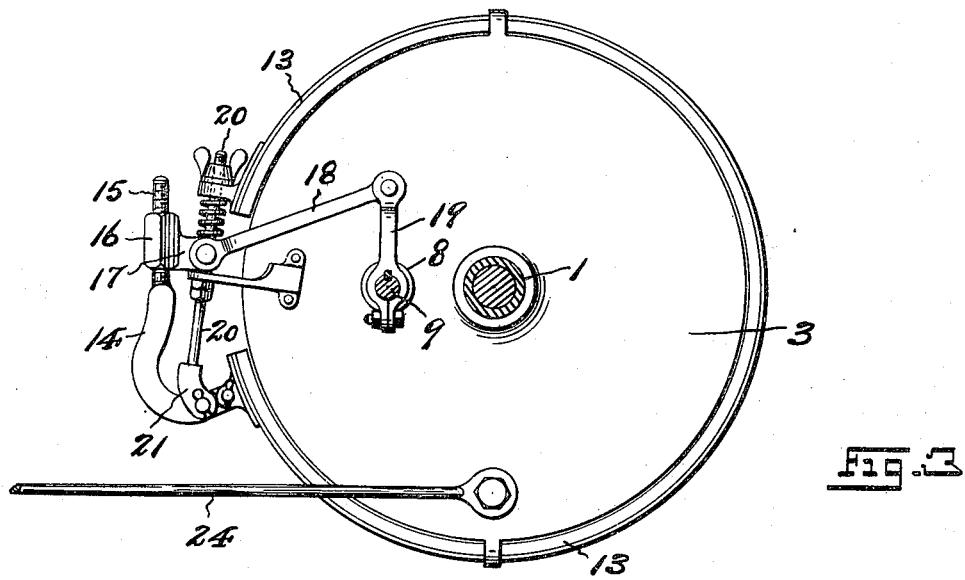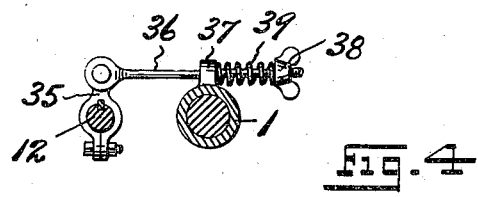

MORRIS MOSKOWITZ, OF MONTCLAIR, NEW JERSEY.

BRAKE MECHANISM FOR AUTOMOBILES.

1,390,373.  Specification of Letters Patent.  Patented Sept. 13, 1921.

Application filed July 15, 1920. Serial No. 396,547.

*To all whom it may concern:*

Be it known that I, MORRIS MOSKOWITZ, a citizen of the United States, residing at Montclair, in the county of Essex and State of New Jersey, have invented certain new and useful Improvements in Brake Mechanism for Automobiles; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in brake mechanism for automobiles; and the invention has reference, more particularly, to an improved construction and arrangement of equalizing brake mechanism adapted to exert equal braking pressure upon both rear wheels of an automobile.

It has long been recognized in railroad practice, that every wheel beneath a railroad car must have a brake-shoe provided therefor so that braking pressure may be applied to all to assure that efficiency and safety which is required by reason of high speed travel, and frequent necessity for quick stops; and, in the automobile practice, by reason of high speed of travel and necessity for quick and sure stopping, it would be equally desirable to brake each of the four wheels of an automobile, but by reason of the necessity of utilizing the forward wheels for steering, and in consequence of the presence of the steering connections, it is not practicable to apply brakes to said forward wheels, and a compromise is effected by braking the rear or driving wheels. It is therefore, of the greatest importance, in order to provide the highest margin of safety, that both rear wheels receive an equal amount of the braking pressure, otherwise one wheel will perform most of the work while the other will do but little, with the result that tendency of the automobile to dangerous skidding is greatly increased, especially in wet weather; and, further disadvantages, such as uncertainty of producing quick stops, and the uneven wear resulting to the tire treads, will occur.

My present invention, therefore, has for its principal object to provide a novel construction of equalizing brake mechanism for automobiles, in which a large equalizing bar is employed in such a relation, that it is not affected or unbalanced by the vibrations or oscillations of the automobile body or chassis, and in which the arrangement of the operating mechanism is such, that the pull of the pedal rod is translated into push upon the equalizing bar and brake operating parts connected with the latter, so that a maximum of braking efficiency is assured and equally applied to both rear wheels.

Other objects of the present invention, not at this time more particularly enumerated, will be clearly understood from the following detailed description of the same.

With the various objects of the invention in view, the same consists, primarily, in the novel arrangement and construction of equalizing brake mechanism for automobiles hereinafter set forth; and, the invention consists, furthermore, in the novel arrangements and combinations of the various devices and parts, as well as in the details of the construction of said parts, all of which will be more fully described in the following specification, and then finally embodied in the claims appended hereto.

The invention is clearly illustrated in the accompanying drawings, in which:—

Figure 1 is a plan view of the novel equalizing brake mechanism as applied to the rear wheels of an automobile; Fig. 2 is a detail vertical longitudinal section drawn on an enlarged scale, and taken on line 2—2 in said Fig. 1; Fig. 3 is a detail section looking toward the brake drum of one wheel, said view being taken on line 3—3 in said Fig. 1, and being also drawn on an enlarged scale; and Fig. 4 is a detail section taken on line 4—4 in said Fig. 1, also drawn on an enlarged scale.

Similar characters of reference are employed in all of the hereinabove described views, to indicate corresponding parts.

Referring now to said drawings, the reference-character 1 indicates the rear axle housing provided with the usual differential housing 2 intermediate its ends. The outer ends of said axle housing are provided with the flanges 3 for supporting the brake band operating mechanism. The reference characters 4 and 5 indicate the respective rear or driving wheels which are operatively related to the rear axle in the usual manner. A propeller shaft housing 6 is longitudinally disposed to extend forwardly from said differential housing 2.

Mounted in bearings 7 and 8, respectively fixed upon one side of said differential housing 2 and a flange 3 of the axle housing, is a rock shaft 9 serving the brake mechanism of the wheel 4, and mounted in bearings 10 and 11, similarly located at the opposite end of said axle housing, is a rock-shaft 12 serving the brake mechanism of the other wheel 5.

Each wheel is provided with a brake mechanism which may comprise an external brake-band 13 which engages the brake-drum rotated by the wheel. Pivotally secured to one end of said brake-band is a lever arm 14, the free end of which curves upwardly and terminates in a screw-threaded shank 15. Threaded on said shank 15 is an adjusting nut 16 provided with a curved or off-set lug 17 to which is pivotally connected one end of a link 18, the opposite end of which is pivotally connected with an operating lever 19, which as to the brake mechanism of one wheel, is fixed to the rock-shaft 9, and as to the brake mechanism of the other wheel, is fixed to the rock-shaft 12. Adjustably secured, in a suitable manner, to the opposite end of the brake-band 13 is a draw-link 20, having at its lower end a forked or bifurcated portion 21 pivotally connected with said lever arm 14.

The equalizing mechanism for operating with equal or balanced pressure the above described brake mechanism, comprises a floating equalizer bar 22, of substantial or generous length, which is arranged close to and parallel with the rear axle housing, and so as to extend transversely beneath the propeller shaft housing 6. The means for operating and supporting said equalizer bar 22 comprises a transverse carrier-bar 23 supported upon the radius rods 24 interconnecting the outer end of the propeller shaft housing 6 with the respective ends of the rear axle housing 1 so as to extend beneath said propeller shaft housing 6, or upon any other equivalent extension of said rear axle housing, or brackets projecting therefrom. Pivotally mounted upon said carrier-bar 23 is a power transmission lever 25, to the outer end of which is connected the pull-rod 26 operated by the foot-pedal 27 or an equivalent hand-lever or the like. Connected to said equalizer bar 22, in central pivoted relation thereto intermediate its ends, is one end of a transmission link 28, the opposite end of the latter being pivotally connected to said power transmission lever 25. Fixed to each rock shaft 9 and 12 is an actuating lever arm 29 provided in its lower free end with an eye or seat portion 30 into which is received an end of said equalizer bar 22, so that the latter may swivel therein when thrusting upon said actuating lever arm. In order to prevent chattering of the ends of said equalizer bar 22 when in seated relation to the respective eyes or seat portions 30 of said actuating lever arms 29, I provide the said respective ends of said equalizer bar with balls or similar devices 31 engaged in place by seating the same in countersunk seats provided in said equalizer bar ends therefor. Each actuating lever arm 29 is provided with a laterally projecting lug 32 with which is associated an adjustable thrust block 33. Arranged between each ball 31 and the opposite thrust block 33 is a compression spring 34 which exerts pressure upon said equalizer bar end to thrust the same in contact with the eye or seat and which nevertheless permits of swiveling action of the connection when said actuating lever arms 29 are swung rearward by pressure of the equalizer bar.

In operating the novel equalizing brake mechanism, pressure is applied to the foot-pedal 27 thereby exerting a pull upon the pull-rod 26 to oscillate the power transmission lever 25, so as to transmit through the transmission link 28 a rearward push or thrust upon the equalizer bar 22. The rearward movement of said equalizer bar is transmitted through its respective ends to the actuating lever arms 29, thereby rocking the rock-shafts 9 and 12 to cause a forward swinging movement of said operating levers 19 and their links 18 so that the lever arms 14 are swung outwardly to exert therethrough and through the draw-links 20 a contracting influence upon the brake-bands 13, whereby the latter are caused to tighten upon or frictionally engage the brake drums of the respective wheels 4 and 5 to produce a braking pressure thereupon. It will be apparent that equalizer bar will compensate the distribution of the braking pressure thus applied equally to the respective wheels 4 and 5, so that each receives an equal application of the retarding frictional pressure of their respective brake-bands, and consequently not only will a quick and sure stopping of the automobile be effected, but all tendency to skidding due to unequal braking pressure on the respective wheels will be avoided.

It will be noted that I place my equalizing bar 22 transversely close to and parallel to the rear axle housing 1, in close proximity to the work to be performed thereby, so that there is little or no lost motion as occurs when the pressure of the equalizer must be transmitted from considerable distance through rods or other far reaching intermediate transmission devices, and what is of even more importance the power transmission lever 25 from which said equalizer bar 22 is supported, is in turn supported directly from the rear axle housing by suitably arranged extensions of the latter, such for example as the radius rods 24, and consequently no oscillation or vibration of the chassis or car body can interfere with or unbalance the work of said equalizing bar, as would be the case if the latter were supported from the chassis or car body as has heretofore been the practice where the use of any kind of equalizing apparatus has been attempted. By virtue of the locational arrangement and mounting of my equalizing mechanism I am able to employ a much longer equalizer bar, and therefore am able to secure a much greater efficiency of equalized distribution of braking pressure, and yet not interfere with the power transmission or traction mechanism of the automobile.

It is well understood that when each separate brakeband is properly adjusted to its respective brake-drum, since the same is held in normal position by some form of spring means, that it is almost impossible to so adjust the same for both wheels that both brake-bands will require the same amount of pressure to effectively operate the same. It is, however, highly desirable that both brake-bands shall be arranged so as to require substantially an equal amount of pressure to perform equal work. To this end, therefore, I provide a novel means for manually adjusting each brake-band separately. This is done preferably by test, and as an initial step in arranging the entire brake mechanism for continued service. For this purpose, I provide the lever arms 14 with the threaded shanks 15 to which the adjusting nuts 16 are connected. By running inwardly or outwardly on said shanks 15 said nuts 16, the leverage of said lever arms may be individually decreased or increased according to need, and until a relative leverage is established between the two brake mechanisms, which will assure that, substantially, they both require the same amount of pressure or force to effectively operate the same, and consequently the equalizer bar 22 is only called upon to balance or equalize the application of force or power, or in other words is only required to serve its real intended purpose, to wit, the distribution of operating power equally to both brake mechanisms.

As an additional means for adjusting the two sets of brake mechanisms so that they will only require, substantially, an equal amount of operative pressure, I may provide adjustable tensioning devices for each rock-shaft 9 and 12, which comprise, in each case, an arm 35 fixed to the rockshaft and having pivotally connected therewith a tension rod 36, which extends through a perforate anchor lug or eye-member 37 fixed on the rear axle housing 1. Said tension rod 36 has threaded upon its free end an adjustable retaining nut 38, and between said nut 38 and said anchor lug is disposed about the rod 36 a coiled spring 39. By adjusting the nut 38 the spring 39 may be either compressed or relaxed, as may be needed to place the required tension upon the brake mechanism of the particular wheel served, and it will be apparent that by relative adjustment of the respective sets of tension devices the respective brake-mechanisms may be, by this means also, balanced so as to require substantially the same amount of operating force or pressure to properly operate the same.

It will be understood that while I have illustrated my invention as applied to the service brake-system of the automobile, it will be clearly understood that the principles may be applied to the emergency brake system or to both systems as well.

I am aware that some changes may be made in the arrangements and combinations of the various devices and parts, as well as in the details of the construction of the same, without departing from the scope of my invention as set forth in the foregoing specification and as defined in the appended claims. Hence, I do not limit my invention to the exact arrangements and combinations of the various devices and parts as described in said specification, nor do I confine myself to the exact details of the construction of said parts as illustrated in the accompanying drawings.

I claim:—

1. In an automobile braking system, the combination with the rear wheel brake mechanisms of an equalizing bar parallel with and adjacent to the axle housing, and means for applying a pushing pressure to said equalizing bar.

2. In an automobile braking system, the combination with the rear wheel brake mechanism of an equalizing bar parallel with and adjacent to the axle housing, a pivoted transmission lever, means extended from said axle housing for supporting said transmission lever, a transmission link inter-connecting one end of said transmission lever with said equalizing bar at a point intermediate the ends of the latter, and means for operating said transmission lever.

3. In an automobile braking system, the combination with the rear wheel brake mechanisms of a transverse equalizing bar disposed adjacent to the axle housing and extending beneath the propeller shaft, actuating lever arms connected with said brake mechanisms respectively and directly engaged with the opposite ends of said equalizing bar, and means for applying a pushing pressure to said equalizing bar.

4. In an automobile braking system, the combination with the rear wheel brake mechanisms of a transverse equalizing bar disposed adjacent to the axle housing and extending beneath the propeller shaft, actuating lever arms connected with said brake mechanisms respectively engaged with the opposite ends of said equalizing bar, a pivoted transmission lever, means extended from said axle housing for supporting said transmission lever, a transmission link interconnecting one end of said transmission lever with said equalizing bar at a central point thereof, and means for operating said transmission lever.

5. In an automobile braking system, the combination with the rear wheel brake mechanisms of a transverse equalizing bar disposed adjacent to the axle housing and extending beneath the propeller shaft, actuating lever arms connected with said brake mechanisms respectively engaged with the opposite ends of said equalizing bar, a pivoted transmission lever, means extended from said axle housing for supporting said transmission lever, a transmission link interconnecting one end of said transmission lever with said equalizing bar at a central point thereof, brake controlling means, and a pull-rod interconnecting said brake controlling means with the opposite end of said transmission lever.

6. In an automobile braking system, the combination with the rear wheel brake mechanisms of an equalizing bar mechanism, means for supporting said equalizing bar mechanism from the axle housing, and means for operating said equalizing bar mechanism.

7. In an automobile braking system, rear wheel brake mechanisms each comprising a brake-band, an operating lever means, a rock-shaft means and an adjustable connection between said operating lever means and said rock-shaft means whereby the leverage of the former may be independently increased or decreased at will.

8. In an automobile braking system, rear wheel brake mechanisms each comprising a brake-band, an operating lever means having a threaded shank at its free end, a rock-shaft means, and a connection having a nut-portion threaded upon said shank of said operating lever means for adjustment thereon to increase or decrease the leverage of said operating lever means, said connection operatively interconnecting said operating lever means with said rock-shaft means.

9. In an automobile braking system, rear wheel brake mechanisms each comprising a brake-band, an operating lever means having a threaded shank at its free end, a rock-shaft means, and a connection having a nut-portion threaded upon said shank of said operating lever means for adjustment thereon to increase or decrease the leverage of said operating lever means, said connection operatively interconnecting said operating lever means with said rock-shaft means; actuating lever arms connected with said rock shaft means, a transverse equalizing bar having its ends engaged respectively with said actuating lever arms, and means for applying pressure to said equalizing bar.

10. In an automobile braking system, rear wheel brake mechanisms each comprising a brake-band, an operating lever means having a threaded shank at its free end, a rock-shaft means, and a connection having a nut-portion threaded upon said shank of said operating lever means for adjustment thereon to increase or decrease the leverage of said operating lever means, said connection operatively interconnecting said operating lever means with said rock-shaft means; actuating lever arms connected with said rock-shaft means, a transverse equalizing bar having its ends engaged respectively with said actuating lever arms, a pivoted transmission lever, means extended from said axle housing for supporting said transmission lever, a transmission link interconnecting one end of said transmission lever with said equalizing bar at a central point thereof, and means for operating said transmission lever.

11. In an automobile braking system, rear wheel brake mechanisms each comprising a brake-band, an operating lever means having a threaded shank at its free end, a rock-shaft means, and a connection having a nut-portion threaded upon said shank of said operating lever means for adjustment thereon to increase or decrease the leverage of said operating lever means, said connection operatively interconnecting said operating lever means with said rock-shaft means; actuating lever arms connected with said rock-shaft means, a transverse equalizing bar having its ends engaged respectively with said actuating lever arms, a pivoted transmission lever, means extended from said axle housing for supporting said transmission lever, a transmission link interconnecting one end of said transmission lever with said equalizing bar at a central point thereof, brake controlling means, and a pull-rod interconnecting said brake controlling means with the opposite end of said transmission lever.

In testimony, that I claim the invention set forth above I have hereunto set my hand this 13th day of July, 1920.

MORRIS MOSKOWITZ.

Witnesses:
GEORGE D. RICHARDS,
FRED'K C. FRAENTZEL.